US011250015B2

(12) United States Patent
Kadel et al.

(10) Patent No.: US 11,250,015 B2
(45) Date of Patent: Feb. 15, 2022

(54) SYSTEMS AND METHODS FOR LOW-LATENCY AGGREGATED-DATA PROVISION

(71) Applicant: COUPANG CORP., Seoul (KR)

(72) Inventors: Prakash Kadel, Seoul (KR); Du Hyeong Kim, Seoul (KR); Jun Huang, Seattle, WA (US); Chengcheng Shen, Issaquah, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/784,375

(22) Filed: Feb. 7, 2020

(65) Prior Publication Data

US 2021/0248151 A1 Aug. 12, 2021

(51) Int. Cl.
*G06F 16/25* (2019.01)
*G06F 16/27* (2019.01)
(Continued)

(52) U.S. Cl.
CPC .......... *G06F 16/252* (2019.01); *G06F 3/0482* (2013.01); *G06F 16/244* (2019.01);
(Continued)

(58) Field of Classification Search
CPC ...... G06F 16/252; G06F 16/27; G06F 16/258; G06F 16/9538
See application file for complete search history.

(56) References Cited

U.S. PATENT DOCUMENTS 6,006,233 A * 12/1999 Schultz ............... G06F 16/2246
2002/0124005 A1 * 9/2002 Matson .................. G06Q 30/06
(Continued)

FOREIGN PATENT DOCUMENTS

CN 102253998 A 11/2011
CN 102933139 B 6/2018
(Continued)

OTHER PUBLICATIONS

Search Report dated Aug. 1, 2020, for Korean Patent Application No. 10-2020-0055383 (9 pp.).
(Continued)

*Primary Examiner* — Apu M Mofiz
*Assistant Examiner* — Farhad Agharahimi
(74) *Attorney, Agent, or Firm* — Finnegan, Henderson, Farabow, Garrett & Dunner, LLP

(57) ABSTRACT

Systems and methods for low latency materialized information provision are disclosed. For example, a system may include at least one memory storing instructions and one or more processors configured to execute the instructions to perform operations. The operations may include receiving, via a materialization service, data from multiple sources related to an item associated with a webpage hosted by a server. The data may include first event data sourced from a real-time feed and second event data sourced from stored data. Operations may include generating synchronized data based on the first and second event data. Operations may include receiving a request from the web server for information related to the item, the request being associated with a user segment. Operations may include identifying data to aggregate to fulfill the request, generating a data structure gathering synchronized data using the data structure, and forwarding the gathered synchronized data to the server.

18 Claims, 12 Drawing Sheets

(51) Int. Cl.
*G06F 16/242* (2019.01)
*G06F 16/9538* (2019.01)
*G06F 3/0482* (2013.01)

(52) U.S. Cl.
CPC ............ *G06F 16/258* (2019.01); *G06F 16/27* (2019.01); *G06F 16/9538* (2019.01)

(56) References Cited

U.S. PATENT DOCUMENTS

| | | | |
|---|---|---|---|
| 2003/0188299 | A1* | 10/2003 | Broughton .............. G06F 8/443 717/141 |
| 2007/0203799 | A1 | 8/2007 | Caballero et al. |
| 2008/0270249 | A1* | 10/2008 | Rosenbaum ....... G06Q 30/0239 705/26.1 |
| 2009/0171927 | A1* | 7/2009 | Nesamoney ........ G06F 16/2458 |
| 2009/0172689 | A1* | 7/2009 | Bobak .................. G06F 9/5061 718/104 |
| 2011/0093568 | A1 | 4/2011 | Thomas |
| 2012/0130987 | A1 | 5/2012 | Bose et al. |
| 2012/0131139 | A1* | 5/2012 | Siripurapu .............. H04L 65/60 709/217 |
| 2012/0323663 | A1 | 12/2012 | Leach |
| 2013/0067063 | A1* | 3/2013 | Vasseur ................... H04L 45/36 709/224 |
| 2013/0103719 | A1* | 4/2013 | Gotz ..................... G06T 11/206 707/798 |
| 2016/0085646 | A1* | 3/2016 | Joshi ................... G06F 11/2041 714/4.11 |

FOREIGN PATENT DOCUMENTS

| | | |
|---|---|---|
| JP | 5075920 B2 | 6/2010 |
| KR | 101109016 B1 | 7/2006 |
| KR | 10-2009-0018485 A | 2/2009 |
| KR | 1020090059412 A | 6/2009 |
| KR | 20130065804 A | 6/2013 |
| KR | 101397181 B1 | 5/2014 |
| KR | 101694980 B1 | 7/2015 |
| KR | 20180108706 A | 10/2018 |
| KR | 20180126792 A | 11/2018 |
| KR | 20190075972 A | 7/2019 |
| KR | 102034833 B1 | 8/2019 |

OTHER PUBLICATIONS

Notice of Preliminary Rejection, dated Nov. 18, 2020, issued by the Korean Intellectual Property Office in Korean Patent Application No. 10-2020-0055383 (3 pp.).
English Translation of the Notice of Preliminary Rejection, dated Nov. 18, 2020, issued by the Korean Intellectual Property Office in Korean Patent Application No. 10-2020-0055383 (3 pp.).
PCT International Search Report and Written Opinion dated Mar. 2, 2021, for counterpart PCT International Application No. PCT/IB2020/061759 (7 pp.).
Search Report for counterpart Patent Application No. 109146370, Issued by the Taiwanese Patent Office, dated Sep. 28, 2021. (4 pages).
Notice of Preliminary Rejection issued by Korean Intellectual Property Office in counterpart Korean Application No. 10-2021-0085910, dated Jul. 15, 2021.

* cited by examiner

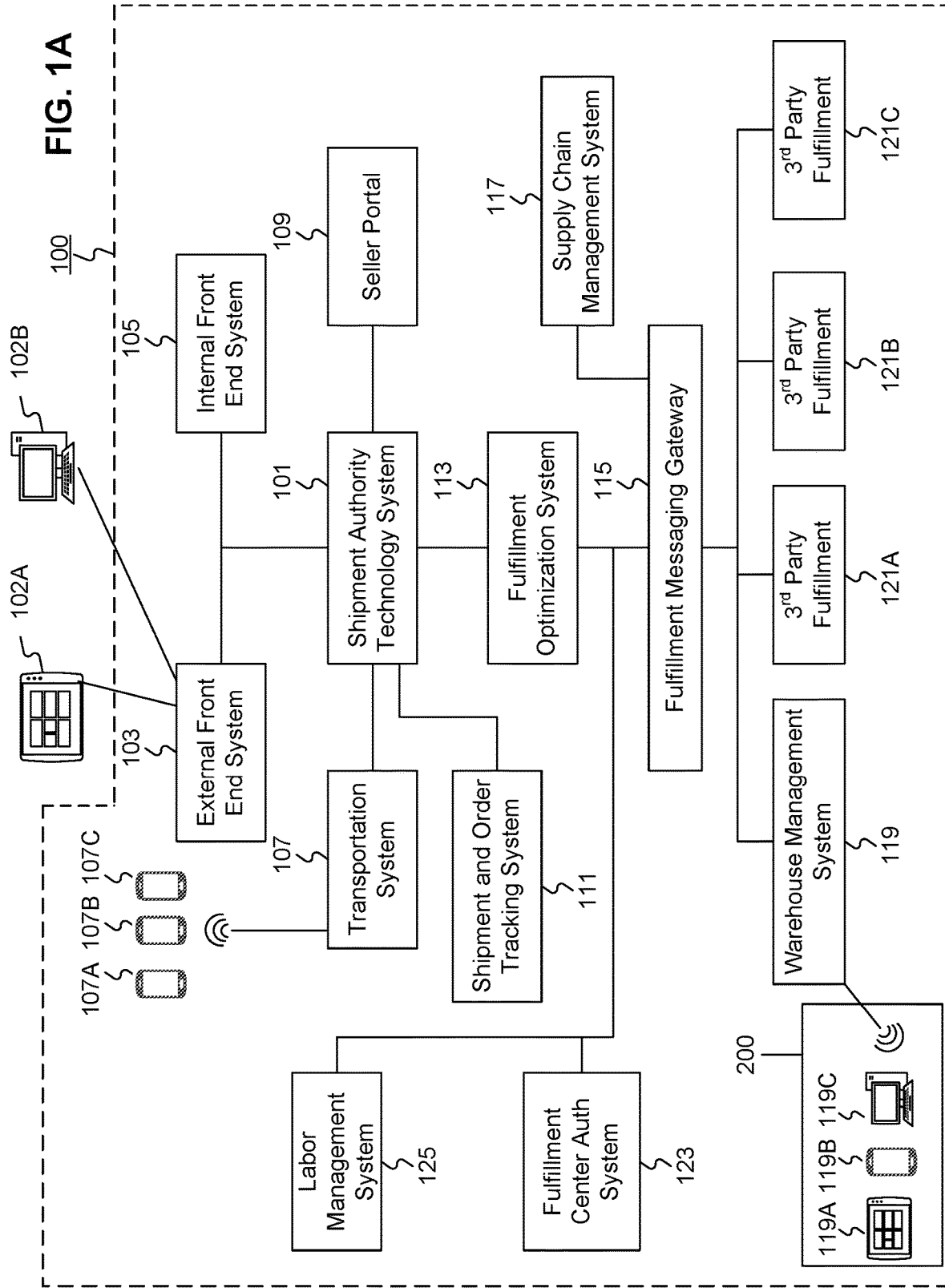

FIG. 1D

SYSTEMS AND METHODS FOR LOW-LATENCY AGGREGATED-DATA PROVISION

TECHNICAL FIELD

The present disclosure generally relates to computerized systems and methods for low-latency aggregated-data provision. In particular, embodiments of the present disclosure relate to inventive and unconventional systems, including a materialization service that generates synchronized data based on real time and stored data and provides aggregated synchronized data using a generated data structure.

BACKGROUND

Service providers often need to present a front-end interface to clients that aggregate data obtained from multiple services on the back end. For example, an online marketplace may rely on a plurality of back end service providers to provide real-time pricing, availability, and shipping data to customers for a plurality of goods sold by a plurality of sellers running independent back end systems. This creates challenges for service providers to efficiently aggregate data with low latency. These challenges can result in complex front end systems that escalate resource use for data aggregation service providers, including increased costs, labor, and development time.

A challenge arises from inconsistently structured back-end data. Back-end service providers often manage and structure data independently from one another and/or from an aggregating service provider. For example, back-end service providers may use different Application Program Interfaces (APIs) that provide differently-structured data to an aggregation service provider. As a result, an aggregation service provider may need to spend additional resources restructuring back-end data, storing back-end data, or searching data stores.

Another challenge arises due to varying rates of data updates by back-end providers. Some data may be updated by back-end service providers on a rapid basis. As an example, a back-end service provider may update a quantity of an item for sale stored at a warehouse thousands of times per second as orders from customers are placed. In contrast, other data may be updated on longer time intervals (e.g., price of an item may not change for many days). Some data may be static (e.g., a shipping date calendar may be based on predetermined holidays, weekends, and other days off). Such varying rates of data updates require different approaches to data aggregation and data management.

Other challenges relate to scalability of aggregation services. Front-end requests and back end data streams may ebb and flow, resulting in large spikes in data aggregation services that strain resources and resulting in lows that may waste resources.

Conventional approaches to solving this problem may rely on storing data in a data store and reading data from a data store upon customer requests. However, this approach can result in problems with scalability as front-end systems increase in size and complexity. This approach may lead to inefficiently writing and rewriting data that is frequently updated by back end service providers.

Other conventional approaches may involve calling APIs in real time based on customer requests (e.g., connecting front-end APIs to back end APIs). However, this can result in high latency as the ability to render a front-end web page may be dependent on multiple back end services. In such approaches, an increase in latency in a back end service may increase front-end latency. Further, issues such as data corruption on the back end may readily propagate to the front-end. Additionally, this approach may result in wasteful API calls where back end data values have not changed between successive calls.

Further, conventional approaches face challenges in providing data aggregation services that are customized to a request. For example, a user may send a request to an online marketplace to purchase an item and ship it to a location, and that item may be available by back end service providers (e.g., sellers) at various warehouses having different quantities in stock. Conventional approaches may be unable to aggregate back end data to determine a price and shipping time specific to a location. Further, owing to the complexity and difficulty in optimizing a front-end system, a back end provider and/or front-end data aggregator may be unable to provide a customized promotion specific to a user or to a user request based on, for example, prior user history.

Conventional approaches may face challenges providing resilient data stores. For example, owing to the complexity described above, conventional approaches may not have adequate failover protections when one or more data stores fails (e.g., creates an exception or an undue delay). As a result, conventional approaches may be unable to provide data when a data store fails.

In view of the shortcomings and problems with conventional approaches to providing data aggregation services, there is a need for unconventional approaches that can optimize data aggregation for low-latency data aggregation provision. Accordingly, there is a need for systems and methods that can efficiently and effectively aggregating data from multiple back end providers and provide aggregated data in a front-end service with low latency and high resiliency, thereby providing advantages over prior solutions by reducing the need for labor and computing resources and by improving resiliency.

SUMMARY

One aspect of the present disclosure is directed to a computer-implemented system for low-latency aggregated-data provision, the system including at least one memory storing instructions and at least one processor configured to execute the instructions to perform operations. The operations may include receiving, via a materialization service, data from multiple sources related to an item associated with a webpage hosted by a web server. The data may include first event data from a first data store, the first event data sourced from a real-time feed, and second event data from a second data store, the second event data sourced from stored data. The operations may include generating synchronized data at the materialization service, based on the first event data and second event data. The operations may include receiving a request from the web server for information related to the item after generating synchronized data, the request being associated with a user segment, and identifying data to aggregate to fulfill the received request. The operations may include generating, based on the identified data and the user segment, a data structure structured to initialize an aggregation process. The operations may include aggregating synchronized data using the data structure; and forwarding the aggregated synchronized data to the web server in response to the request.

Another aspect of the present disclosure is directed to a computer-implemented method for low-latency aggregated-data provision. The method may include receiving, via a materialization service, data from multiple sources related to an item associated with a webpage hosted by a web server. The data may include first event data from a first data store, the first event data sourced from a real-time feed, and second event data from a second data store, the second event data sourced from stored data. The method may include generating synchronized data at the materialization service, based on the first event data and second event data. The method may include receiving a request from the web server for information related to the item after generating synchronized data, the request being associated with a user segment, and identifying data to aggregate to fulfill the received request. The method may include generating, based on the identified data and the user segment, a data structure structured to initialize an aggregation process. The method may include aggregating synchronized data using the data structure; and forwarding the aggregated synchronized data to the web server in response to the request.

Yet another aspect of the present disclosure is directed to a computer-implemented system for low-latency aggregated-data provision, the system comprising at least one memory storing instructions and at least one processor configured to execute the instructions to perform operations. The operations may include receiving, via a materialization service, data from multiple sources related to an item associated with a webpage hosted by a web server. The data may include first event data from a first data store comprising a key-value store, the first event data sourced from a real-time feed. The data may include second event data from a second data store comprising a clustered database, the second event data sourced from stored data comprising primitive data. The operations may include generating synchronized data at the materialization service, based on the first event data, the second event data, and a timestamp of the first event. The operations may include receiving a request from the web server for information related to the item after generating synchronized data. The operations may include determining a user segment based on at least one of a location, a user history, or a promotion condition. The operations may include identifying data to aggregate to fulfill the received request and generating, based on the identified data and the user segment, a data structure structured to initialize an aggregation process. The data structure may include a directed acyclic graph. Generating the data structure may include generating an earlier node of the directed acyclic graph based on a later node of the directed acyclic graph. The operations may include aggregating synchronized data using the data structure and forwarding the aggregated synchronized data to the web server in response to the request.

Other systems, methods, and computer-readable media are also discussed herein.

BRIEF DESCRIPTION OF THE DRAWINGS

Figure 1D:
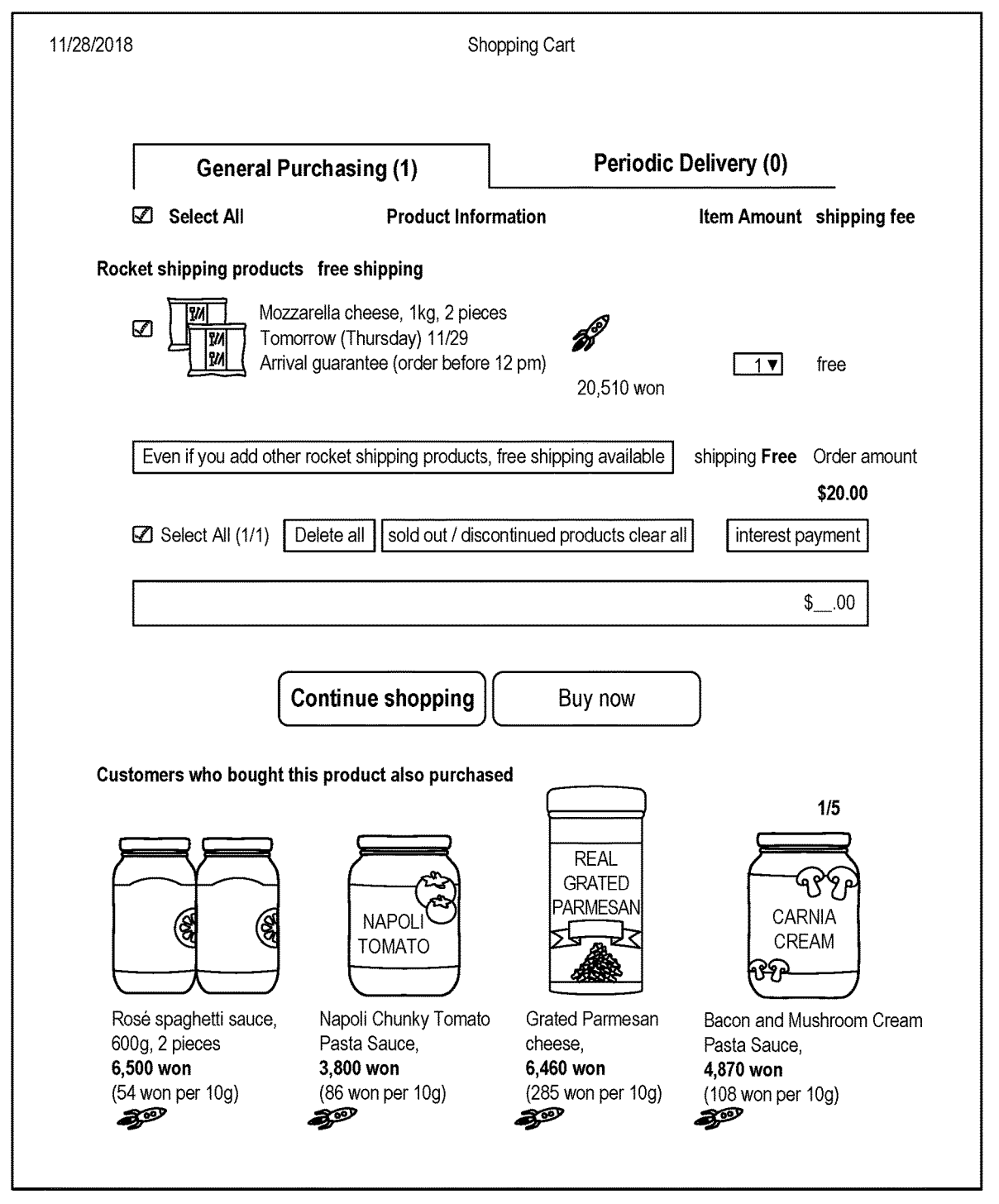

FIG. 1A is a schematic block diagram illustrating an exemplary embodiment of a network comprising computerized systems for communications enabling shipping, transportation, and logistics operations, consistent with the disclosed embodiments.

FIG. 1D depicts a sample Cart page that includes items in a virtual shopping cart along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for low-latency data aggregation.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may comprise one or more of these systems, while in another aspect, external front-end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front-end system 103.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103.

External front-end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the Order page and click or otherwise interact with a user interface element that sends the information to external front-end system 103. From there, external front-end system 103 may send the information to different systems in system 100 to enable the creation and processing of a new order with the products in the shopping cart.

In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may comprise one or more of these systems, while in another aspect, internal front-end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured)

operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front-end system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
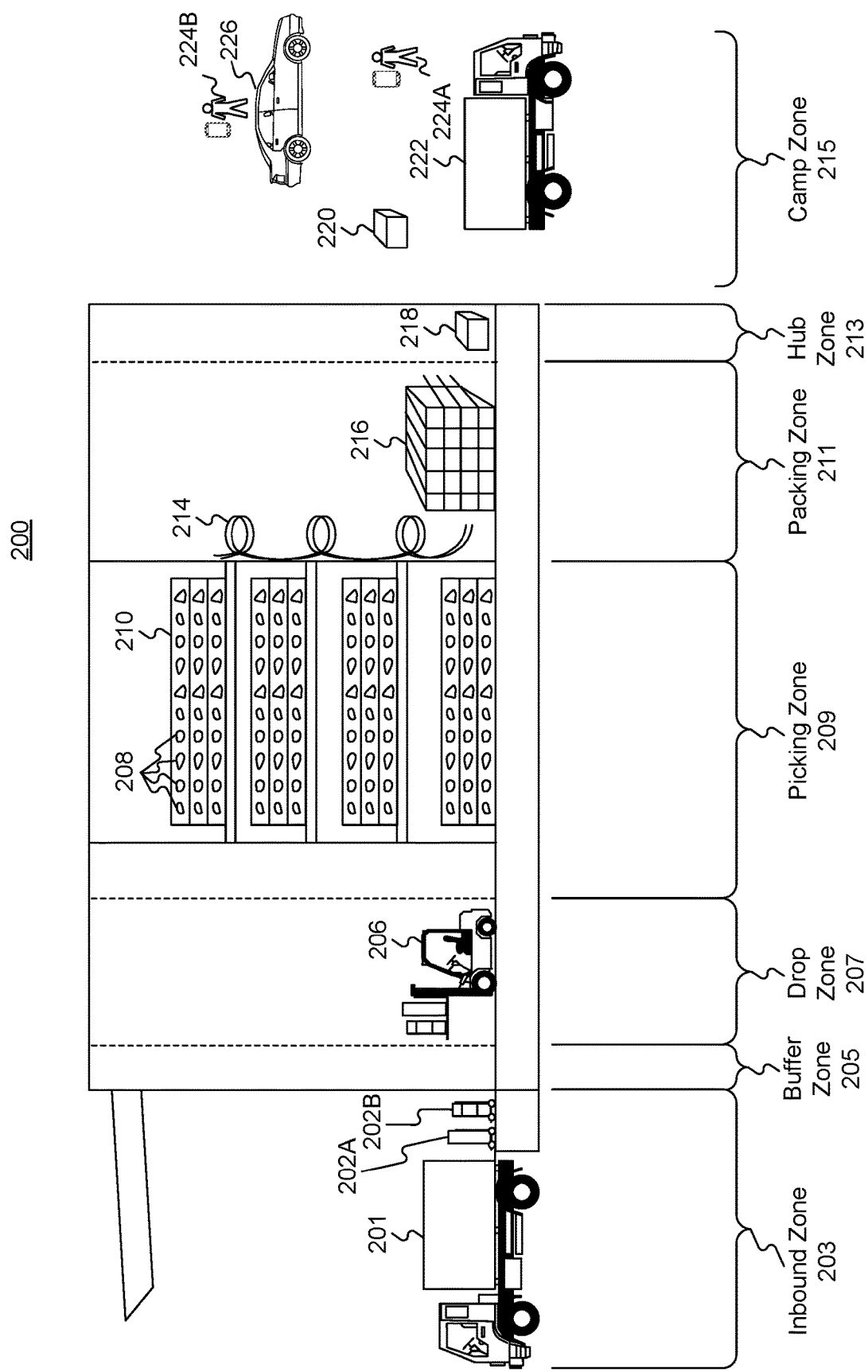
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
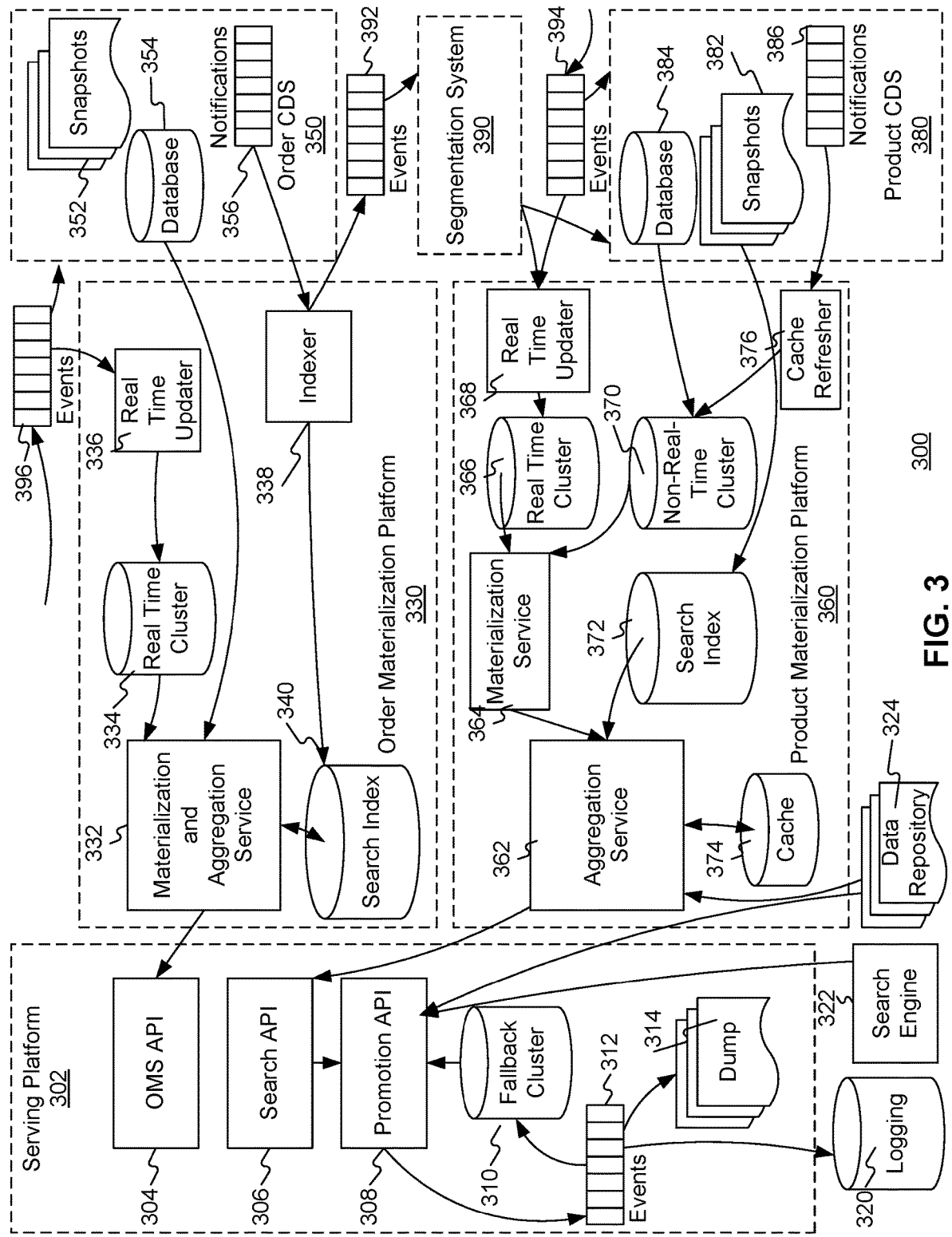
FIG. 3 depicts a system for low-latency data aggregation services, consistent with disclosed embodiments.

FIG. 3 depicts a system 300 for low-latency data aggregation services, consistent with disclosed embodiments. In some embodiments, system 300 is configured to process product metadata (i.e., item data), including metadata for products from a catalog or other listing, product promotion information. in some embodiments, system 300 may be configured to process order and delivery metadata (i.e., order information), including, for example, delivery information from fulfillment of order requests and/or order document data. In some embodiments, order document data includes data related to order information (e.g., some or all order related information). Order document data may be generated when an order is placed. Order document data may include product information, delivery information (e.g., an address), payment information received from a payment system, and/or or other order data. Order document data may be updated by a payment system. In some embodiments, order document data may be updated by a fulfillment system. For example, order document data may be updated at one or more stages of order fulfillment, including delivery preparation, shipment status, delivery status, or other stages of order fulfillment. Order document data may be updated if a user cancels an order, requests a refund, or by any other user action.

In some embodiments, system 300 may be configured to process user information, including, for example, a user profile and/or user segmentation data (i.e., user classification data). A user may refer to an individual, organization, or system that uses serving platform 302 (e.g., a customer may search for and/or order a product through serving platform 302). A user may be a registered user having a user account storing identification data, address data, payment data, user preferences, user history data (e.g., searching, browsing, or ordering data) and/or any other user data. System 300 may be configured to process high volumes of data (e.g., billions of requests per day with peaks of millions per second).

As shown, system 300 may include various components, including serving platform 302, order materialization platform 330, an order central data storage (CDS) 350, a product materialization platform 360, product CDS 380, a segmentation system 390, and other components. Some or all components of system 300 may be connected to each other via a network. Data transfers between components of system 300 may be encrypted (e.g., end-to-end encryption). One or more components of system 300 may include an API.

In some embodiments, aspects of system 300 may be implemented on one or more cloud services designed to generate ("spin-up") ephemeral container instances (e.g., MICROSOFT AZURE containers, RED HAT OPENSHIFT containers, or other container instances) in response to triggers (e.g., receiving a push event or other types of received events), assign one or more tasks to a container instance, and terminate ("spin-down") a container instance upon completion of a task. By implementing methods using cloud services, disclosed systems may efficiently provision resources based on demand and efficiently scale. Cloud service may provide security advantages because the ephemeral container instances may be closed and destroyed upon completion of a task. That is, the container instances do not permit access from outside using terminals and/or remote shell tools like SSH, RTP, FTP, and/or CURL, for example. Further, terminating container instances may include destroying data, thereby protecting sensitive data. Destroying data can provide security advantages because it may involve permanently deleting data (e.g., overwriting data) and associated file pointers.

Components of system 300 may be configured to receive, transmit, process, and/or generate events, consistent with disclosed embodiments. Events may include events 312, notifications 356, notifications 386, events 396, events 392, events 394, and/or other events not depicted in FIG. 3. Events may be received or transmitted as push or pull events in data pipelines. Events may include, for example, KAFKA events, AZURE EVENT HUB events, and/or other events. Events may have a log-structured collection of data packets (e.g., messages) appended sequentially to a file. Events may be received rapidly in pipelines (e.g., thousands or millions of times per second). Events relating to a same data value (e.g., a quantity of stock) may be received from multiple data sources with varying latencies. Accordingly, events may accordingly be timestamped to facilitate synchronization (e.g., timestamped by a component of system 300 according to a time generated, transmitted, and/or received), consistent with disclosed embodiments. Events may be provided in a variety of formats and/or in a standardized format. An event format may include a buffer, a JSON, a log-structured format, and/or another format.

As will be appreciated by one skilled in the art, the components of system 300 can be arranged in various ways and implemented with any suitable combination of hardware, firmware, and/or software, as applicable. For example, as compared to the depiction in FIG. 3, system 300 may include a larger or smaller number of serving platforms, order materialization platforms, order CDSs, product materialization platforms, product CDSs, and/or segmentation systems. In addition, system 300 may further include other components and/or devices not depicted that perform and/or assist in the performance of one or more processes, consistent with the disclosed embodiments. The exemplary components and arrangements shown in FIG. 3 are not intended to limit the disclosed embodiments.

Serving platform 302 may be configured to provide front-end services, consistent with disclosed embodiments. As an example, serving platform 302 may include external front-end system 103 and internal front-end system 105. Serving platform 302 may be configured to provide an interface to client devices (e.g., via a browser) in which to search products, provide promotions, order products, and the like.

Serving platform 302 may include one or more servers, clusters of servers, storages (e.g., databases), and/or any other computing device consistent with disclosed embodiments (e.g., computing device 600). As shown in FIG. 3, serving platform 302 may include an Order Materialization System (OMS) API 304, a search API 306, a promotion API 308, a fallback cluster 310, and a dump 314. The exemplary components and arrangements shown in serving platform 302 are not limiting on the disclosed embodiments. It should be understood that other arrangements and components may be included in serving platform 302.

OMS API 304 may be configured to receive or retrieve information from an order materialization platform 330, consistent with disclosed embodiments. OMS API 304 may be configured to receive data and call order materialization platform 330 to retrieve aggregated data relating to orders and delivery statuses. In some embodiments, OMS API 304 may be configured to interface with modules to complete an order, provide order history, display order and/or delivery status, provide statistics on sellers (e.g., third-party sellers), provide settlement systems for settling transactions with third parties, or the like. In some embodiments, OMS API 304 may be connected to other computing systems or modules. For example, OMS API 304 may be connected to components of system 100, such as a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and/or labor management system (LMS) 125.

Search API 306 may be configured to perform a product search and provide search results, consistent with disclosed embodiments. Search API 306 may be configured to receive or retrieve information from a product materialization platform 360, consistent with disclosed embodiments. Generally, search API 306 may be configured to send and receive data with other modules or APIs. For example, search API 306 may be connected to microservices to provide product information, webpages, purchase interfaces, search interfaces, single product detail pages, cart pages, checkout pages, order status pages, and/or to provide any other frontend services, consistent with disclosed embodiments. In some embodiments, search API 306 may be connected to components of system 100, such as a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and/or labor management system (LMS) 125. As shown in FIG. 3, search API 306 may provide search results to promotion API 308.

Promotion API 308 may be configured to provide promotional information based on search results received from search API 306. For example, promotion API 308 may suggest an item to prioritize in a search result list by, for example, placing an advertised item at the top of a list or otherwise changing an appearance of a search result to promote an item (e.g., adding a label, changing a font, changing a color, etc.). Promotion API 308 may be configured to suggest items that relate to other items in a search result based on a keyword, a user segment, a product compatibility, etc.

In some embodiments, promotion API 308 may receive and/or transmit data (e.g., item data, search results) from an external search engine 322 and/or data repository 324. Search engine 322 may be configured to search system 300 by interfacing with promotion API 308. Search engine 322 may be a search engine for online shopping, for example. Search engine 322 may include a cache (not shown) for storing computationally expensive results, thereby decreasing latency time. Search engine 322 may include filtered event data without comprising detailed event data (e.g., product identifiers and other basic product data to identify a top-ten seller, a most relevant product, or other information). Search engine 322 may include one or more data clustered data stores configured for failsafe protection, consistent with disclosed embodiments.

Data repository 324 may include real time product and/or order data. Data repository 324 may be global data repositories (i.e., repositories of information across multiple components of system 300). As an example, data repositories may include fulfillment center region mapping data that comprises a list of regions being served through different fulfillment centers. In some embodiments, fulfillment center mapping data may be combined with product and inventory data to predict expected shipment date and/or delivery date for a particular product and a particular delivery address or particular user. As additional, nonlimiting examples, data repository 324 may include fulfillment center hours of operation, disaster zone information, blacklisted zip codes, blacklisted products and/or product categories, holiday calendars, and/or other information that may be used to predict a delivery status. Data repository 324 may include S3 files and/or other files cached as individual instances. Data repository 324 may include indexed, structured data optimized to be searchable (e.g., B-trees).

Promotion API 380 may be configured to generate and/or transmit events 312, consistent with disclosed embodiments. Events 312 may include data related to searches, such as search terms, search results (e.g., data relating to items), promotions, shipment information, user data (e.g., user profile, user segment, user location, user). In some embodiments, events 312 may be based on data generated by search API 306 and/or promotion API 308. In some embodiments, events 312 may be generated by search API 306 and/or promotion API 308. As shown, events API 306 may be routed to fallback cluster 310, dump 314, and/or logging 320.

Dump 314 may include a cloud storage for storing event data during processing. Dump 314 may include request-response information that passes through serving platform 302 (e.g., search requests-search result information; order placement-order result information, and/or other request-response information). Dump 314 may include request-response information stored in a variety of formats (e.g., JSON format). In some embodiments, dump 314 may serve as a backup for loss of data transmitted to logging 320 (e.g., a data manager and/or logging 320 may request and receive missing data from dump 314). Dump 314 may include data used for periodic batch jobs (e.g., nightly batch jobs) to validate request-response data and identify missing data in other system components or transmission (e.g., to identify whether information provided to users via serving platform 302 had a missing field)

Fallback cluster 310 may include a cluster for managing events. For example, promotion API may pass events 312 to fallback cluster 310 during processing of an API call to manage loading (e.g., when search API 306 and/or promotion API 308 reaches a failover point). Fallback cluster 310 may be configured to perform functions of search API 306 and/or promotion API 308, consistent with disclosed embodiments. Fallback cluster 310 may include a REDIS cluster and/or any other cluster designed for scalability (e.g., linear scalability).

Order materialization platform 330 may be configured to aggregate data to provide order and delivery status data related to orders, consistent with disclosed embodiments. As shown in FIG. 3, order materialization platform 330 may include a materialization and aggregation service 332, a real time cluster 334, a real time updater 336, an indexer 338, and/or an search index 340, consistent with disclosed embodiments. The exemplary components and arrangements shown in order materialization platform 330 are not limiting on the disclosed embodiments. It should be understood that other arrangements and components may be included in order materialization platform 330.

Materialization and aggregation service 332 may be configured to aggregate data, consistent with disclosed embodiments. Materialization and aggregation service 332 may be configured to synchronize event data across multiple data sources by identifying and aggregating current data values (e.g., by comparing data sourced from a plurality of external sources and data from an order CDS 350 and identifying a most recent quantity data). Materialization and aggregation service 332 may aggregate data stored in an order CDS (e.g., event data received from database 354). In some embodiments, materialization and aggregation service 332 may be configured to read data from an search index 340 and from order CDS 350.

Materialization and aggregation service 332 may dynamically determine which data to aggregate based a client request (e.g., a request handled by OMS API 304). In some embodiments, materialization and aggregation service 332 may be configured to generate a data structure structured to initialize an aggregation process. For example, a data structure may include a directed acyclic graph to optimize aggregation process (e.g., to minimize a time required to aggregate based on availability of data in an order CDS, a latency of an external system, etc.), consistent with disclosed embodiments. In some embodiments, materialization and aggregation service 332 may employ a circuit breaker to ignore failed aggregations. For example, a circuit breaker may include using a plurality of components (e.g., servers, clusters, or other components) configured to allow processing by one component upon failure of another component and further configured to cease execution by a failing component. Accordingly, a circuit breaker may prevent the execution of unnecessary processes or tasks. Further, a circuit breaker may allow continued downstream operations when an upstream component fails.

In some embodiments, materialization and aggregation service 332 may include one or more clusters (i.e., zones). Clusters may be configured to independently and jointly receive event data from multiple sources (e.g., events 396, search index 340, real time cluster 334). In some embodiments, traffic may be redirected between clusters based on detected issues (i.e., failover). In some embodiments, one or more zones may be capable of independently handling all traffic through materialization and aggregation service 332.

In some embodiments, real time cluster 334 and real time updater 336 may process and dynamically store event data, consistent with disclosed embodiments. Real time cluster 334 may include a plurality of clusters backing up stored data configured for failover protection, consistent with disclosed embodiments (e.g., two clusters). In some embodiments, if one of the plurality of clusters fails, real time cluster 334 may rely on another of the clusters as a backup (i.e., real time cluster 334 implements failover protection). As one example, all clusters of real-time cluster 334 may fail and a "circuit breaker" may open (e.g., REALTIME REDIS), causing materialization service 365 to receive data from database 354 and/or search index 340.

Real time updater 336 may be configured to receive events from other components of system 300 and/or in a data pipeline from components outside system 300 (e.g., events 396), consistent with disclosed embodiments. Events 396 may include events generated by seller systems, for example. In some embodiments, events 396 may be received only from registered external systems (e.g., sellers that apply for and obtain approval to submit events relating to products). In some embodiments, events 396 may be received from an unregistered system and/or a registered system. Real time updater 336 may be configured to parse events based on an event format (e.g., buffer, JSON, log-structured) and/or to store events in format that differs from a received format (e.g., a standardized format). Real time updater 336 may be configured to update real time cluster 366 based on received event data. In some embodiments, real time updater 336 may update real time cluster 366 based on a determination of whether received event data differs from data stored in real time cluster 366.

In some embodiments, indexer 338 may maintain an search index 340. Indexer 338 may receive a notification (e.g., notifications 356) from an order CDS 350, the notification including information relating to an order (e.g., an order may be placed, a delivery status may be updated, a payment method may be updated). Indexer 350 may include a configuration store defining values that determines whether to store data from a notification in search index 340. In some embodiments, indexer 338 generates events 392 based on the notification and transmits events 392 to segmentation system 390. Indexer 338 may be configured to determine whether to generate an event 392 by analyzing a notification. For example, indexer 338 may generate events 392 for user-generated actions (e.g., placing an order, canceling an order, changing a delivery location) but not for system-generated actions (e.g., changes to a shipment location during order tracking).

Search index 340 may include event data relating to orders received from order CDS 350 via indexer 338. In some embodiments, indexing may be optimized to provide data by user. For example, data may be partitioned in an index so that data associated with a single user may be retrieved with low latency. Search index 340 may include a cache, a database, and/or a long-term data store. Search index 340 may include data stored in a searchable data structure (e.g., a B-Tree). Search index 340 may include a distributed RESTful (Representational State Transfer) search and analytics engine (e.g., ELASTICSEARCH) to facilitate indexing, search, and analysis of event data.

Order CDS 350 may include snapshots 352 and database 354, consistent with disclosed embodiments. The exemplary components and arrangements shown in order CDS 350 are not limiting on the disclosed embodiments. It should be understood that other arrangements and components may be included in order CDS 350.

Order CDS 350 may be configured to receive events 396. Order CDS 350 may be configured to parse events based on an event format (e.g., buffer, JSON, log-structured) and/or to store events in format that differs from a received format (e.g., a standardized format). Order CDS 350 may be configured to efficiently store event data (e.g., to discard event data that duplicates existing data stored in database 354 or to cross-reference event data of database 354 for compact storage).

Snapshots 352 may include order "snapshots" i.e., copies of information stored in database 354 to provide versioning history, consistent with disclosed embodiments. For example, a snapshot may correspond to a point-in-time copy of a node within database 354 and a plurality of snapshots may capture a series of time points associated with a node. Snapshots consistent with disclosed embodiments may include an APACHE CASSANDRA snapshot, a REDIS snapshot, a POSTGRES snapshot, and/or any other snapshot of a database designed for scalability and fault tolerance.

Database 354 may include order information, consistent with disclosed embodiments. Database 354 may include any known database. Database 354 may include, for example, an APACHE CASSANDRA database, a REDIS database, a POSTGRESQL database, and/or any other database designed for scalability and/or fault tolerance. Database 354 may include event data based on events 396.

Database 354 may include a plurality of clusters configured for failover protection, consistent with disclosed embodiments. For example, database 354 may include a plurality of clusters backing up stored data (e.g., two clusters). In some embodiments, if one of the plurality of clusters fails, order CDS 350 may rely on another of the clusters (i.e., order CDS 350 may implement failover protection).

Order CDS 350 may be configured to generate notifications 356 related to order information, consistent with disclosed embodiments. Notifications 356 may include an event, consistent with disclosed embodiments. Notifications 356 may include an order status, item information, shipping data, or other order information.

Product materialization platform 360 may be configured to aggregate data to provide order and delivery status data related to orders, consistent with disclosed embodiments. As shown in FIG. 3, product materialization platform 360 may include an aggregation service 362, a materialization service 364, a real time cluster 366, a real time updater 368, non-real-time cluster 370, an search index 372, a cache 374, and a cache refresher 376, consistent with disclosed embodiments. The exemplary components and arrangements shown in product materialization platform 360 are not limiting on the disclosed embodiments. It should be understood that other arrangements and components may be included in product materialization platform 360.

Aggregation service 362 may be configured to aggregate data, consistent with disclosed embodiments. Aggregation service 362 may be configured to synchronize event data across multiple data sources by identifying and aggregating current data values (e.g., by comparing data sourced from a plurality of external sources and data from an order CDS 350 and identifying a most recent quantity data). Aggregation service 362 may aggregate data stored in an order CDS (e.g., event data received from database 354). In some embodiments, aggregation service 362 may be configured to read data from a materialization service 364, an search index 372 and/or a cache 374.

Aggregation service 362 may dynamically determine which data to aggregate based a client request (e.g., a request handled by search API 306). In some embodiments, aggregation service 362 may be an API. In some embodiments, aggregation service 362 may employ a circuit breaker to ignore failed aggregations.

In some embodiments, aggregation service 362 may be configured to generate a data structure structured to initialize an aggregation process. For example, a data structure may include a directed acyclic graph to optimize an aggregation process (e.g., to minimize a time required to aggregate based on availability of data in a product CDS and a latency of an external system in providing event data), consistent with disclosed embodiments.

Materialization service 364 may be configured to read data from real time cluster 366 and from non-real-time cluster 370 to synchronize event data, consistent with disclosed embodiments. In some embodiments, materialization service 364 may include one or more clusters (i.e., zones). In some embodiments, a plurality of clusters serves a client. Clusters may be configured to independently and jointly receive event data from multiple sources. In some embodiments, traffic may be redirected between clusters based on detected issues. In some embodiments, one or more zones may be capable of independently handling all traffic through aggregation service 362.

Events 394 may include data order fulfillment data, payment data, user data, catalog data, and/or any other data, consistent with disclosed embodiments. Events may be generated by external systems to reflect changes in data including stock data, pricing data, item (listing) data, user data (e.g., data relating to a user as discussed in reference to FIG. 4). Further details of events 394 are described in reference to FIG. 8.

In some embodiments, real time cluster 366 and real time updater 338 may process and store dynamic data from external systems received in a data pipeline as events 394. In some embodiments, events 394 may be received only from registered external systems. In some embodiments, events 394 may be received from an unregistered system and/or a registered system. Real time cluster 366 may include a database and/or cache containing real-time data for items (e.g., price, quantity in stock, etc.). Real time cluster 366 may be configured to provide data to materialization service 364. Real time cluster 366 may include a REDIS cluster and/or any other cache or cluster for implementing a distributed, in-memory key-value database with varying durability.

Real time cluster 366 may include a plurality of clusters backing up stored data configured for failover protection, consistent with disclosed embodiments (e.g., two clusters). In some embodiments, if one of the plurality of clusters fails, real time cluster 366 may rely on another of the clusters as a backup (i.e., real time cluster 366 may implement failover protection). In some embodiments, all clusters of real-time cluster 366 may fail and a "circuit breaker" may open (e.g., REALTIME REDIS), causing materialization service 365 to receive data from non-real-time cluster 370.

Real time updater 368 may be configured to receive events from other components of system 300 and/or components outside system 300 (e.g., events 394), consistent with disclosed embodiments. In some embodiments, events 394 may be received from an external system (e.g., a seller system). In some embodiments, real time updater 368 may receive events from a segmentation system 390. Real time updater 368 may be configured to update real time cluster 366 based on received event data. In some embodiments, update real time cluster 366 based on a determination of whether received event data differs from data stored in real time cluster 366.

Non-real-time cluster 370 may include a plurality of clusters backing up stored data configured for failover protection, consistent with disclosed embodiments (e.g., two clusters). In some embodiments, if one of the plurality of clusters fails, non-real-time cluster 370 may rely on another of the clusters as a backup (i.e., non-real-time cluster 370 may implement failover protection). In some embodiments, all clusters of non-real-time cluster 370 may fail and a "circuit breaker" may open (e.g., REALTIME REDIS), causing materialization service 365 to receive data from real time cluster 366.

Search index 372 may include event data relating to items received from product CDS 380. In some embodiments, indexing may be optimized to provide data by seller (i.e., vendor) or other supplier. For example, data may be partitioned in an index so that data associated with a single seller may be retrieved with low latency. Search index 372 may include a cache, a database, and/or a long-term data store. Search index 340 may include data stored in a searchable data structure (e.g., a B-Tree). Product materialization platform 360 may receive a notification (e.g., notifications 386) from a product CDS 380, the notification including information relating to an item. Notifications may include large quantities of data that are not relevant to product materialization, so product materialization platform 360 may include a configuration store defining values that determines whether to store data from a notification in search index 372. Search index 372 may include a distributed RESTful (Representational State Transfer-ful) search and analytics engine (e.g., ELASTICSEARCH) to facilitate indexing, search, and analysis of event data.

Cache 374 may include . . . . In some embodiments, cache 374 stores aggregated data provided by aggregation service 362. Accordingly, cache 374 may provide efficiency advantages because aggregation service 362 may retrieve already-aggregated event data upon a request without having to re-aggregate previously-aggregated event data. Cache 374 may include data stored that are computationally expensive to produce, thereby improving the response of aggregation service 362 for large requests. Cache 374 may include data recently served by aggregation service 362, thereby increasing stability during upstream storage or network connection failures.

Product CDS 380 may include snapshots 382 and database 384, consistent with disclosed embodiments. Product CDS 380 may be configured to receive events 394 from computing components outside system 300. In some embodiments, product CDS 380 may be configured to receive events from segmentation system 390. The exemplary components and arrangements shown in product CDS 380 are not limiting on the disclosed embodiments. It should be understood that other arrangements and components may be included in product CDS 380.

Product CDS 380 may be configured parse received events based on an event format (e.g., buffer, JSON, log-structured) and/or to store events in format that differs from a received format (e.g., a standardized format). Product CDS 380 may be configured to efficiently store event data (e.g., to discard event data that duplicates existing data stored in database 384 or to cross-reference event data of database 384 for compact storage).

Snapshots 382 may include order "snapshots," i.e. copies of information stored in database 384 to provide versioning history, consistent with disclosed embodiments. Database 384 may include product information, consistent with disclosed embodiments. Database 384 may include any known database, including a database designed for scalability and/or fault tolerance (e.g., a CASSANDRA database). Database 384 may include a plurality of clusters configured for failover protection, consistent with disclosed embodiments.

Product CDS 380 may be configured to generate notifications 386 related to order information, consistent with disclosed embodiments. Notifications 386 may include an event, consistent with disclosed embodiments. Notifications 386 may include an item information, quantity data, price data, specifications of an item, size data, etc. Notifications 386 may include copies of one or more events 394, consistent with disclosed embodiments.

Segmentation system 390 may be configured to segment (i.e., classify) users to provide personalized data aggregation, consistent with disclosed embodiments. Segmentation system 390 may be configured to receive data relating to a user profile, user activities, purchase histories, and the like, and segment users based on received data. Segmentation system 390 may be configured to generate targeted promotions to target customers with relevant items and/or campaigns. Additional details of segmentation system 390 are disclosed in reference to FIG. 4.

Figure 4:
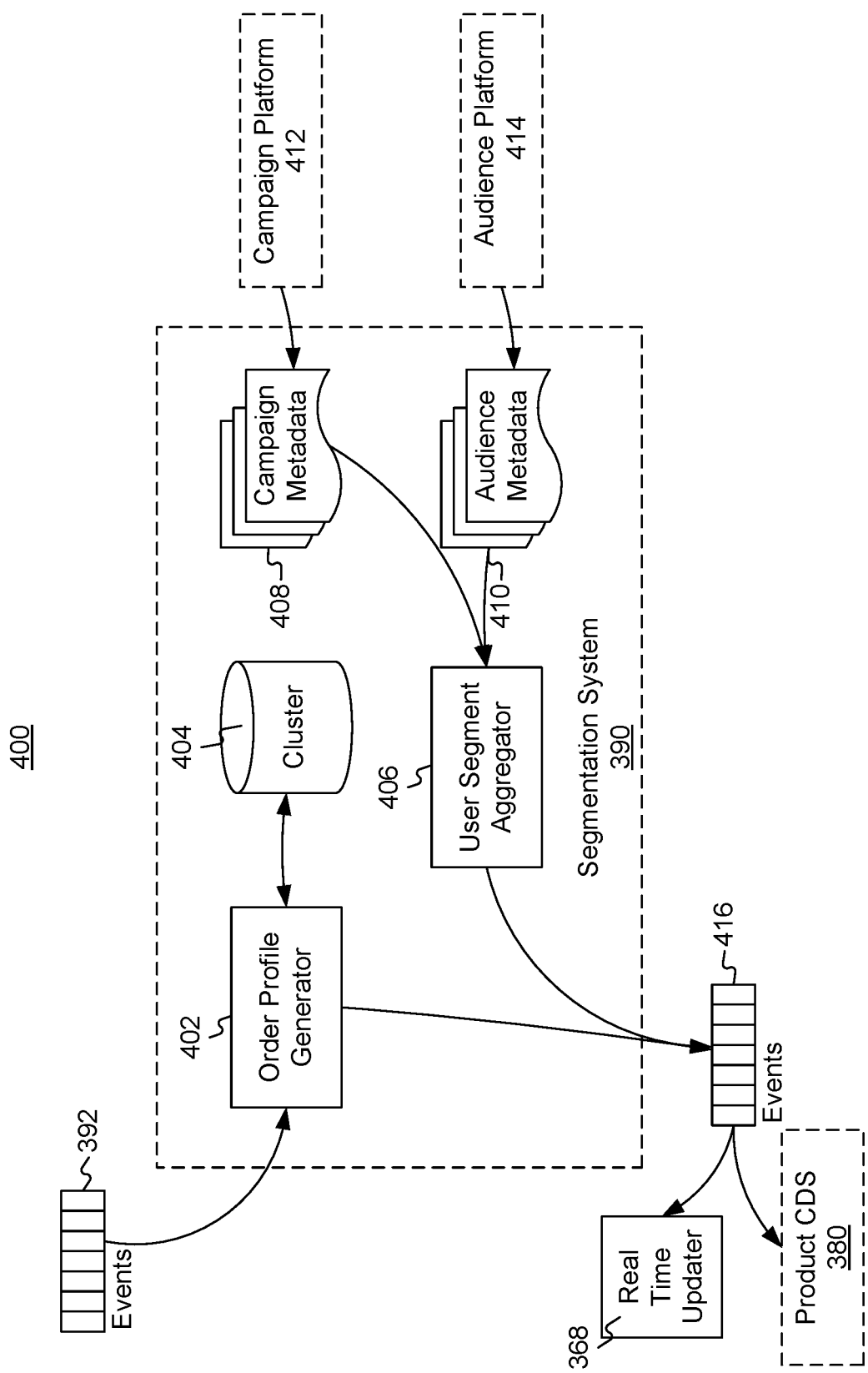
FIG. 4 depicts a for segmenting and profiling users, consistent with disclosed embodiments.

FIG. 4 depicts a system 400 for segmenting and profiling users, consistent with disclosed embodiments. As shown, system 400 may include various components, including segmentation system 390, a campaign platform 412, an audience platform 414, a product CDS 380, and a real time updater 368. Some or all components of system 400 may be connected to each other via a network. It should be understood that components of system 400 may be included in system 300 and that systems 400 and 300 may be part of a same system. Data transfers between components of system 400 may be encrypted (e.g., end-to-end encryption). One or more components of system 400 may include an API.

In some embodiments, aspects of system 400 may be implemented on one or more cloud services, consistent with disclosed embodiments. Components of system 400 may be configured to receive, transmit, process, and/or generate events, consistent with disclosed embodiments.

Segmentation system 390 may be configured to segment (i.e., classify) users to provide personalized data aggregation, consistent with disclosed embodiments. As shown, segmentation system 390 may include an order profile generator 402, a cluster 404, a user segment aggregator 406, campaign metadata 408, and/or audience metadata 410. The exemplary components and arrangements shown in segmentation system 390 are not limiting on the disclosed embodiments. It should be understood that other arrangements and components may be included in product segmentation system 390.

Order profile generator may be configured to generate an order profile based on events 392, consistent with disclosed embodiments. Events 392 may include information related to user-generated actions (e.g., placing an order, canceling an order, changing a delivery location). An order profile may include a summary or other representation of an order. Order profile generator may generate an order profile based on order event data stored in cluster 404, consistent with disclosed embodiments.

Cluster 404 may include information related to users and orders, consistent with disclosed embodiments. For example, cluster 404 may include data related to a purchasing history, a shipping history, user preferences, or other information related to users and orders. In some embodiments, cluster 404 may include a plurality of clusters configured for failsafe protection. Cluster 404 may include a cluster, cache, or database configured for scalability, consistent with disclosed embodiments.

User segment aggregator 406 may be configured to generate segment criteria, consistent with disclosed embodiments. For example, user segment aggregator may aggregate data related to a campaign and/or an audience to generate segment criteria (i.e., classification criteria). User segment aggregator may be configured to generate criteria for segmenting users based on a location, a user history, a promotion condition, or other conditions. In some embodiments, user segment aggregator may be configured to aggregate campaign metadata 408 and audience metadata 410, consistent with disclosed embodiments.

Campaign metadata 408 may include data relating to a promotion or other sales effort, consistent with disclosed embodiments. For example, campaign metadata 408 may include a data relating to a promotion condition. Campaign metadata 408 may include marketing data, such as data to display, channels of distribution, target demographics, and/or other marketing data. For example, campaign metadata 408 may include information about a 10% promotion coupon available to new mothers on certain holidays, including information to display on various banners and/or webpages accessible through serving platform 302. In some embodiments, campaign metadata 408 include information identifying distribution channels corresponding to a campaign (e.g., in-site banners, text message, email, or other channels). A promotion condition may be based on information relating to characteristics of users and correlations to purchasing history, consistent with disclosed embodiments. Campaign metadata 408 may be stored in RDMS format, JSON format, or other structured data formats.

Audience metadata 410 may include user data, consistent with disclosed embodiments. Audience metadata 410 may include user identifiers. Audience metadata 410 may include static and/or dynamic data. Static audience data may include a static text file comprising user identifiers, the files being generated and/or updated periodicity with batch jobs. For example, audience metadata 410 may include a static file for "new mothers," created though batch jobs that analyze purchase behavior of users over a period of days or weeks. Dynamic audience data may change in real time and include users that perform actions that satisfy rules. For example, dynamic audience metadata may include rules to identify customers of a particular vendor, who subscribe to a particular email list, who are located in a particular region at present, or other rules to identify customers. The list may be updated or change in real time (e.g., user who transmits location information suggesting the user has entered and left a particular city may be dynamically placed on and removed from a dynamic audience associated with that particular city. Audience metadata 410 may be structured as a list, as a CSV file, and/or any other format suitable for organizing lists of identifiers.

Campaign platform 412 may be configured to establish a campaign for promotion and marketing, consistent with disclosed embodiments. For example, a third-party seller may use campaign platform 412 to establish campaign metadata 408. Campaign platform 412 may include an API.

Audience platform 414 may be configured to establish an audience for campaigns, consistent with disclosed embodiments. For example, a third-party seller may use audience platform 414 to establish audience metadata 410 (e.g., by establishing rules to identify dynamic audiences, by providing static audience data, and/or other actions). Audience platform 414 may include an API.

As shown, segmentation system 390 may be configured to generate events 416, consistent with disclosed embodiments. Events 416 may be generated by order profile generator 402 and/or user segment aggregator 406. Events 416 may include data relating to users, campaigns, user segments, audiences, or other data relating to users and orders, consistent with disclosed embodiments. Events 415 may include order profile data with order related statistics and/or counters. For example, order profile data may include a fresh (new) order count, an over order count, an order cancel rate, a last order data. Events 416 may include user segmentation information (e.g., membership status changes, audience information, or other user segmentation data).

In some embodiments, segmentation system 390 transmits events 416 to real time updater 368 and/or product CDS 380, consistent with disclosed embodiments. Real time updater 368 and product CDS 380 are described in greater detail in reference to FIG. 3.

Figure 5:
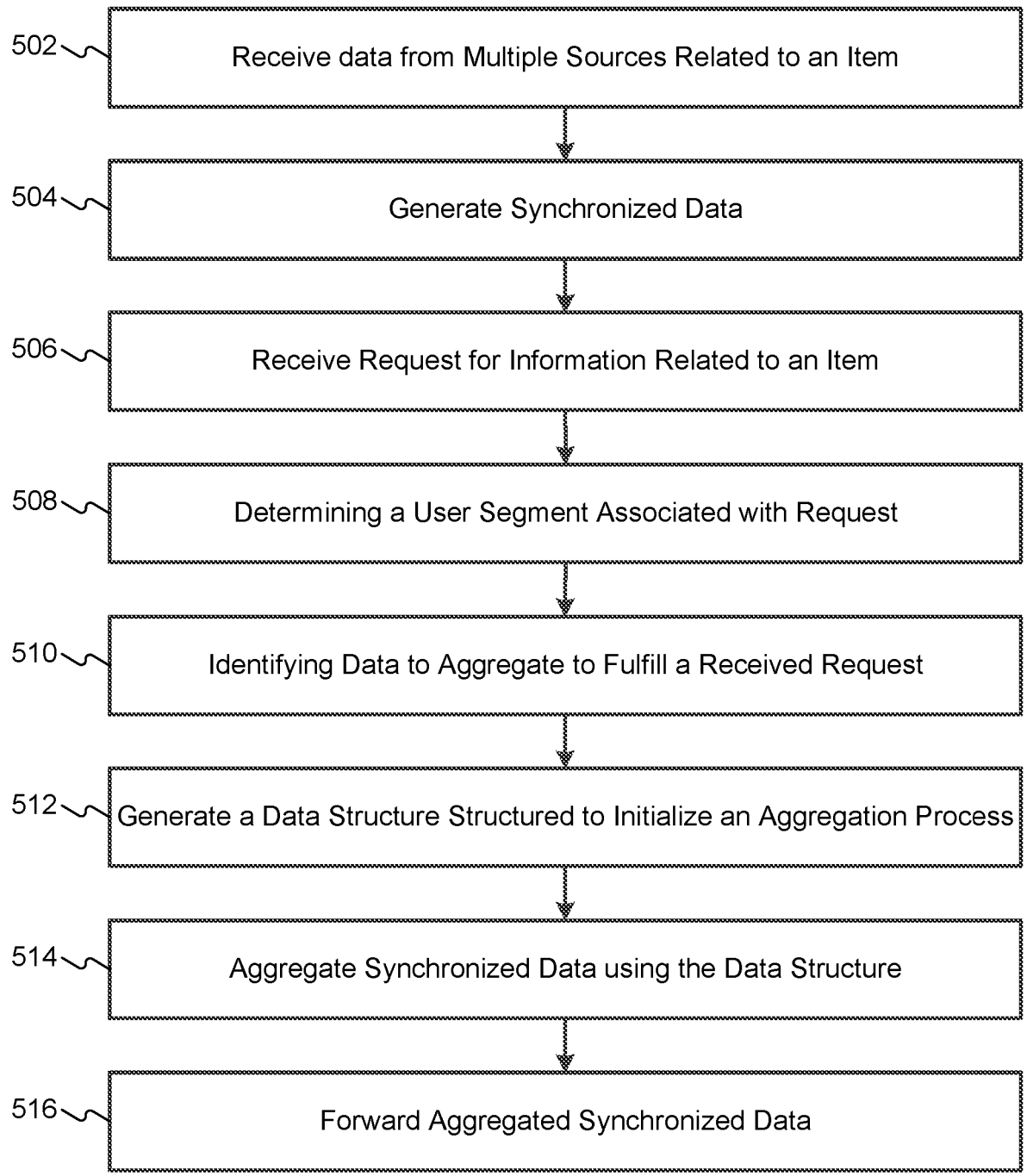
FIG. 5 is a flow chart illustrating an exemplary process for low-latency data aggregation, consistent with disclosed embodiments.

FIG. 5 is a flow chart illustrating an exemplary process 500 for low-latency data aggregation, consistent with disclosed embodiments. In some embodiments, components of systems 300 and 400 perform steps of process 500. For example, order materialization platform 330, product materialization platform 360, and/or segmentation system 390 may perform steps of process 400. It should be noted that other components of systems 300 and 400 may perform operations of one or more steps of process 500. Steps of process 500 may be performed using encryption methods (e.g., process 6500 may be end-to-end encrypted).

At step 502, a service may receive data from multiple sources related to an item, consistent with disclosed embodiments. In some embodiments, step 502, materialization and aggregation service 332 may receive data from real time cluster, database 354, and/or search index, consistent with disclosed embodiments. In some embodiments, at step 502, materialization service 364 may receive data from real time cluster 366, non-real-time cluster 370, consistent with disclosed embodiments. A service of step 502 may comprises a first cluster and a second cluster, the first cluster and second cluster being configured to independently and jointly receive the data from multiple sources related to the item and to synchronize the first event data and second event data.

An item of step 502 may include, for example, a product for sale. An item may be associated with a webpage hosted by a webserver (e.g., with serving platform 302 and/or a seller system). In some embodiments, a webpage comprises interactive elements and information about an item and/or one or more search results satisfying a search request. For example, a webpage may include an SDP (Single Detail Page), consistent with disclosed embodiments. As another example, a webpage may include an SRP (search results page), consistent with disclosed embodiments.

In some embodiments, received data at step 502 includes first event data from a first data store, consistent with disclosed embodiments. For example, a first data store may include real time cluster 334 sourced from a real time feed (e.g., real time updater 336 and/or events 396). In some embodiments, a first data store may include database 365 sourced from a real time feed (e.g., events 396). In some embodiments, a first data store may include a key value store (e.g., a REDIS database).

In some embodiments, received data at step 502 includes second event data from a second data store, consistent with disclosed embodiments. In some embodiments, a second data store includes a clustered database comprising a first cluster and a second cluster. A first and second cluster of a second data store may be configured for failover protection (i.e., upon failure by one of a first cluster or second cluster, second event data may be received from the other of the first cluster or second cluster). In some embodiments, a second data store includes search index 340 and/or database 354. In some embodiments, a second data store may be updated data based on a push event (e.g., indexer 338 may update search index 340 based on a notification 356). In some embodiments, second event data may be sourced from stored data comprising primitive data. Primitive data may include basic number formats and/or basic values associated with an order or an item and that may not require calculations or manipulations to derive. Primitive data may change less frequently over time than higher level data.

At step 504, a service may generate synchronized data, consistent with disclosed embodiments. In some embodiments, a service of step 504 may include materialization and aggregation service 332 and/or materialization service 364. Generating synchronized data may be based on first event data and second event data. For example, generating synchronized data may include merging event data and second event data. As another example, generating synchronized data may include determining a chronology of event data based on timestamps associated with event data and selecting event data based on the chronology. In some embodiments, generating synchronized data may be based on first event data, second event data, and a timestamp of first event data. For example, generating synchronized data may include combining first event data and second event data based on one or more timestamps associated with first and second event data. To illustrate the example, generating synchronized data may include choosing a most recent or a most reliable first and second event data value based on a timestamp.

At step 506, a service may receive a request for information related to an item, consistent with disclosed embodiments. In some embodiments, a service of step 506 may include materialization and aggregation service 332 and/or materialization service 364. A request may be received after generating synchronized data, consistent with disclosed embodiments. In some embodiments, a request may be received and cause a service to generate synchronized data, consistent with disclosed embodiments. In some embodiments, a request may be associated with a user segment (e.g., a user segment may be identified in a request or determined based on a request).

At step 508, in some embodiments, a service may determine a user segment associated with a request, consistent with disclosed embodiments. In some embodiments, a service of step 508 includes segmentation service 510. In some embodiments, a component of product materialization platform 360 may determine a user segment associated with a request (e.g., based on event data received from segmentation service 390). In some embodiments, a user segment (i.e., user classification) may be based on a location (e.g., a location of a user device), a user history (e.g., an ordering history, a browsing history), or another user characteristic. In some embodiments, a user segment may be based on a promotion condition (e.g., a condition for determining whether a promotion should be offered to a user).

At step 510, a service may identify data to aggregate to fulfill a received request, consistent with disclosed embodiments. In some embodiments, a service of step 510 may include materialization and aggregation service 332 and/or materialization service 364. Identifying data to aggregate may be based on an algorithm. For example, a request may include a request to provide an estimate of a shipping time for an item to reach a location, and step 510 may include identifying that one or more of the following data may be needed to fulfill the request: a quantity of an item at a warehouse, a location of a warehouse, a picker schedule, a shipping schedule, a shipping method, a time of day, a holiday schedule, a weather forecast, a shipping business indicator, a picker availability indicator, or any other data needed to fulfill the request. In some embodiments, identifying data at step 510 may be based on a user segment.

At step 512, a service may generate a data structure structured to initialize an aggregation process, consistent with disclosed embodiments. In some embodiments, a service of step 512 may include materialization and aggregation service 332 and/or materialization service 364. In some embodiments, a data structure may include a directed acyclic graph. In some embodiments, generating a data structure may include generating an earlier node of a directed acyclic graph based on a later node of the directed acyclic graph. In this way, a directed acyclic graph may be generated by "working backwards" from a desired result (e.g., an estimate of a shipping time).

Nodes of a directed acyclic graph or other data structure may correspond to alternative data sources for aggregating data. For example, in some embodiments, materialization and aggregation service 332 generates a data structure having nodes that may correspond to addresses, locations, or other identifiers of event data in real time cluster 334, search index 340, and/or database 354. For example, in some embodiments, aggregation service 362 generates a data structure having nodes that may correspond to identifiers of event data in materialization service 364, search index 372, and/or cache 374.

A data structure of step 512 may include data relating to a latency for retrieving event data or other information about availability of event data. Accordingly, a data structure of step 512 may be configured to identify a fastest or shortest path for aggregating data.

At step 514, a service may aggregate synchronized data using a data structure, consistent with disclosed embodiments. In some embodiments, a service of step 512 may include materialization and aggregation service 332 and/or materialization service 364. In some embodiments, aggregating data at step 514 includes following a path through a data structure to aggregate data (e.g., aggregating data according to a path through nodes of a directed acyclic graph).

At step 516, a service may forward aggregated synchronized data, consistent with disclosed embodiments. Forwarding aggregated synchronized data may included providing aggregated synchronized data to a front-end service (e.g., serving platform 302).

Figure 6:
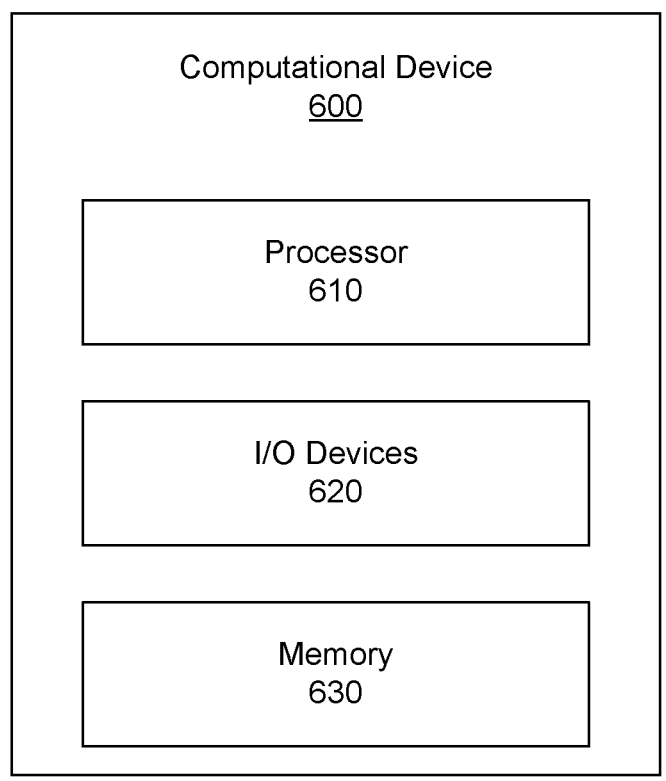
FIG. 6 is a block diagram of an exemplary computational device, consistent with disclosed embodiments.

FIG. 6 is a block diagram of an exemplary computational device 600, consistent with disclosed embodiments. illustrates an exemplary computational device 600 for implementing embodiments and features of present the disclosure. By way of example computational device 600 or a similar computational device may be used to implement any of the components, devices, or systems described herein (e.g., aspects of systems 100, 300, and/or 400).

The components in computational device 600 are provided for purposes of illustration. Computational device 600 may include, for example, a processor 610, input/output (I/O) units 620, and/or a memory 630. Computational device 600 may include one or more of each component, it may include only some of these components, and it may include other components not depicted in FIG. 6. It is contemplated that additional arrangements, number of components, and/or other modifications may be made to the disclosed computational device 600, consistent with the present disclosure.

Processor 610 may be, for example, a computing processor. Processor 610 may be configured to provide cloud services, consistent with disclosed embodiments. In some embodiments, processor 610 is a microprocessor. Processor 610 may be, for example, a single-core processor or a multiple-core processor (e.g., dual core, quad core). In some embodiments, processor 610 includes a single-core processor configured with virtual processing technologies. In some embodiments, processor 610 may include logical processors to simultaneously execute and control multiple processes. Processor 610 may implement technologies such as virtual-machine technologies to execute, control, run, manipulate, and/or store multiple processes, applications, and/or programs. In some embodiments, processor 610 may include a multiple-core processor configured to provide parallel processing functionalities for execution of multiple processes simultaneously. Processor 610 may be configured, for example, to execute one or more instructions stored in memory 630 to perform operations.

I/O units 620 may include any input and/or output device. For example, I/O units 620 may include a sensor, an input user device, an output user device, a keyboard, a mouse, a track pad, a display, a speaker, a microphone, a battery, a transceiver, and/or any other input or output device. In some embodiments, a device of I/O units 620 may be part of computational device 600. In some embodiments, a device of I/O units 620 may be part of a different device that may be connected to computational device 600. In some embodiments, I/O 620 may include components for receiving inputs and/or generating and displaying an interface.

In some embodiments, memory 630 may include one or more programs (e.g., modules, codes, scripts, software, and/or algorithms). In some embodiments, a program is written in one or more programming languages and/or scripting languages. In some embodiments, a program may be implemented and/or replicated as firmware or circuit logic. In some embodiments, a program collects data via I/O unit 620. Programs may be configured to perform any of the methods described herein.

In some embodiments, memory 630 may include data. In some embodiments, data may be encrypted and/or unencrypted. In some embodiments, data may be collected using I/O unit 620 and/or receive from another computing device. In some embodiments, data may include a scalable data store, consistent with disclosed embodiments. In some embodiments, data may include one or more databases comprising an organized or structured collection of tables, queries, objects, schema, reports, and/or views.

Figure 7:
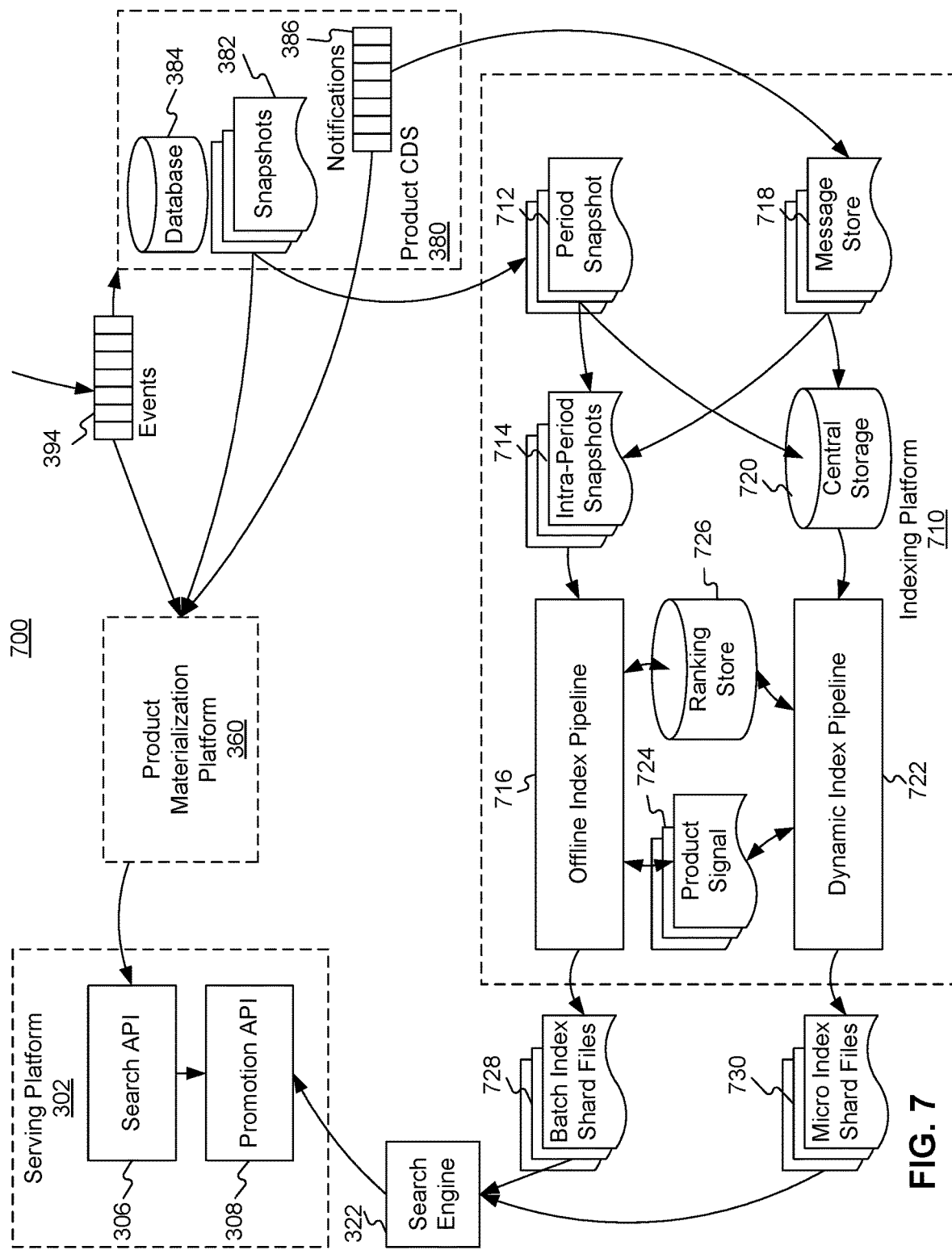
FIG. 7 depicts a system for low-latency data aggregation services, consistent with disclosed embodiments.

FIG. 7 depicts a system 700 for low-latency data aggregation services, consistent with disclosed embodiments. System 700 may be included in system 300 and/or may include components of system 300. For example, system 700 may include a serving platform 302, search API 306, promotion API 308, search engine 322, product materialization platform 360, product CDS 380, database 384, snapshots 382, notifications 386, events 394, and/or one or more other components of system 300. Additionally, system 700 may include an indexing platform 710, batch index shard files 728, micro index shard files 730 and/or any other component. Indexing platform 710 may include period snapshots 712, intra-period snapshots 714, offline index pipeline 716, message store 718, central storage 720, dynamic index pipeline 722, product signal 724, and/or ranking store 726. It is to be understood that system 700 may include different components and/or more or fewer components than those depicted in system 700.

System 700 illustrates exemplary data pathways and components for processing events 394. As described herein, events 394 may be generated by external systems and platforms and may be received by Product CDS 380. For example, events 394 may be generated by components depicted below in FIG. 8 and/or any other system or platform.

In some embodiments, components of indexing platform 710 may filter data of events 394 received via product CDS 380 to remove information. For example, events 394 may include product identifier data and indexing platform 710 store data comprising product identifier data without product description data. It is to be understood that other examples of filtered event data are possible, consistent with disclosed embodiments.

In some embodiments, snapshots 382 of product CDS 380 may feed (i.e., transfer data to) period snapshot 712, consistent with disclosed embodiments. Period snapshot 712 may include snapshots of data stored in product CDS 380 over a period of time (e.g., hourly snapshot, a daily snapshot, weekly snapshot, or other periodic snapshot). Period snapshots 712 may include filtered event data.

As shown in FIG. 7, period snapshots 712 may feed both intra-period snapshots 714 and central storage 720. Intra-period snapshots 714 may include data stored in product CDS 380 over a period of time (e.g., hourly snapshot, a daily snapshot, weekly snapshot, or other periodic snapshot). Intra-period snapshots 714 may include filtered event data, consistent with disclosed embodiments. Intra-period snapshots 714 may include snapshots of a period that is shorter than the period of snapshots 712. For example, period snapshots 712 may include daily snapshots and intra-period snapshots 714 may include 3-hour snapshots. In some embodiments, intra-period snapshots 714 may create snapshots based on a combination of period snapshots 712 and event data of message store 718. Intra-period snapshots 714 may feed offline index pipeline 716.

Referring again to FIG. 7, notifications 386 may be provided to indexing platform 710 via message store 718, consistent with disclosed embodiments. Message store 718 may comprise real-time event data received from product CDS 380. Message store 718 may include a stream (e.g., a Kafka stream or other stream). As shown, message store 718 may feed both central storage 720 and intra-period snapshots 714.

Central storage 720 may include a database (e.g., a relational database), consistent with disclosed embodiments.

Central storage 720 may include filtered event data. In some embodiments, central storage 720 may include dynamic data (e.g., notifications 386 received via message store). In some embodiments, central storage may include data based on period snapshots 712.

Indexing platform 710 may include offline index pipeline 716 and dynamic index pipeline 722. Offline index pipeline 716 and/or dynamic index pipeline 722 may be indexed as respective searchable data structures (e.g., a tree or another searchable data structure). Offline index pipeline 716 and/or dynamic index pipeline 722 may include filtered event data, consistent with disclosed embodiments.

In some embodiments, offline index pipeline 716 may include information that changes at a slower rate than information included in dynamic index pipeline 722. For example, offline index pipeline 716 may include information related to product sizes offered for sale while dynamic index pipeline may include information related to stock quantities that may frequently change.

As shown, offline index pipeline 716 may feed batch index shard files 728, consistent with disclosed embodiments. Batch index shard files 728 may include copies of data stored in offline index pipeline 716 (e.g., filtered event data). Batch index shard files 728 may include horizontal partitions of event data structured as a database, consistent with disclosed embodiments. Indexing platform 710 may transmit batch index shard files 728 based on a schedule and/or an indication that data stored in offline index pipeline 716 has changed (e.g., batch index shard files 728 may include updated values of filtered event data).

As shown, dynamic index pipeline 722 may feed micro index shard files 730, consistent with disclosed embodiments. Micro index shard files 730 may include copies of data stored in dynamic index pipeline 722 (e.g., filtered event data). Batch index shard files 728 may include horizontal partitions of event data structured as a database, consistent with disclosed embodiments. Indexing platform 710 may transmit micro index shard files 730 based on a schedule and/or an indication that data stored in dynamic index pipeline 722 has changed (e.g., micro index shard files 730 may include updated values of filtered event data). As compared to batch index shard files 728, micro index shard files 730 may be transmitted more frequently.

Offline index pipeline 716 and/or dynamic index pipeline 722 may be connected to product signal 724. Product signal 724 may include data related to a product.

Offline index pipeline 716 and/or dynamic index pipeline 722 may be connected to ranking store 726. Ranking store 726 may include indexed data relating to a product ranking (e.g., a ranking based on sales volume, a ranking based on customer feedback, a location-based ranking, a seller-based ranking, and/or any other ranking).

As shown in FIG. 7, search engine 322 receives indexed data (batch index shard files 728 and/or micro index shard files 730) and provides indexed data to promotion API 308. In some embodiments, indexed data may include filtered event data organized as a searchable data structure. In some embodiments, a user may conduct a search of information provided by search engine 322 using serving platform 322 and retrieve a list of items related to a keyword, for example, using indexed data provided by search engine 322.

As an illustrative, nonlimiting example, in an implementation of system 700, a user may conduct a search for the term "diapers" using serving platform 302. Serving platform 302 may retrieve a list of search results (e.g., top ten hits for "diaper") from indexed data provided by search engine, the list comprising a product identifier and filtered event data. Based on the search, serving platform 302 may retrieve additional, real time data (e.g., stock quantity data) from search API previously received from product materialization platform 360. Additional, real time data may include data for more products in a list of search results.

Figure 8:
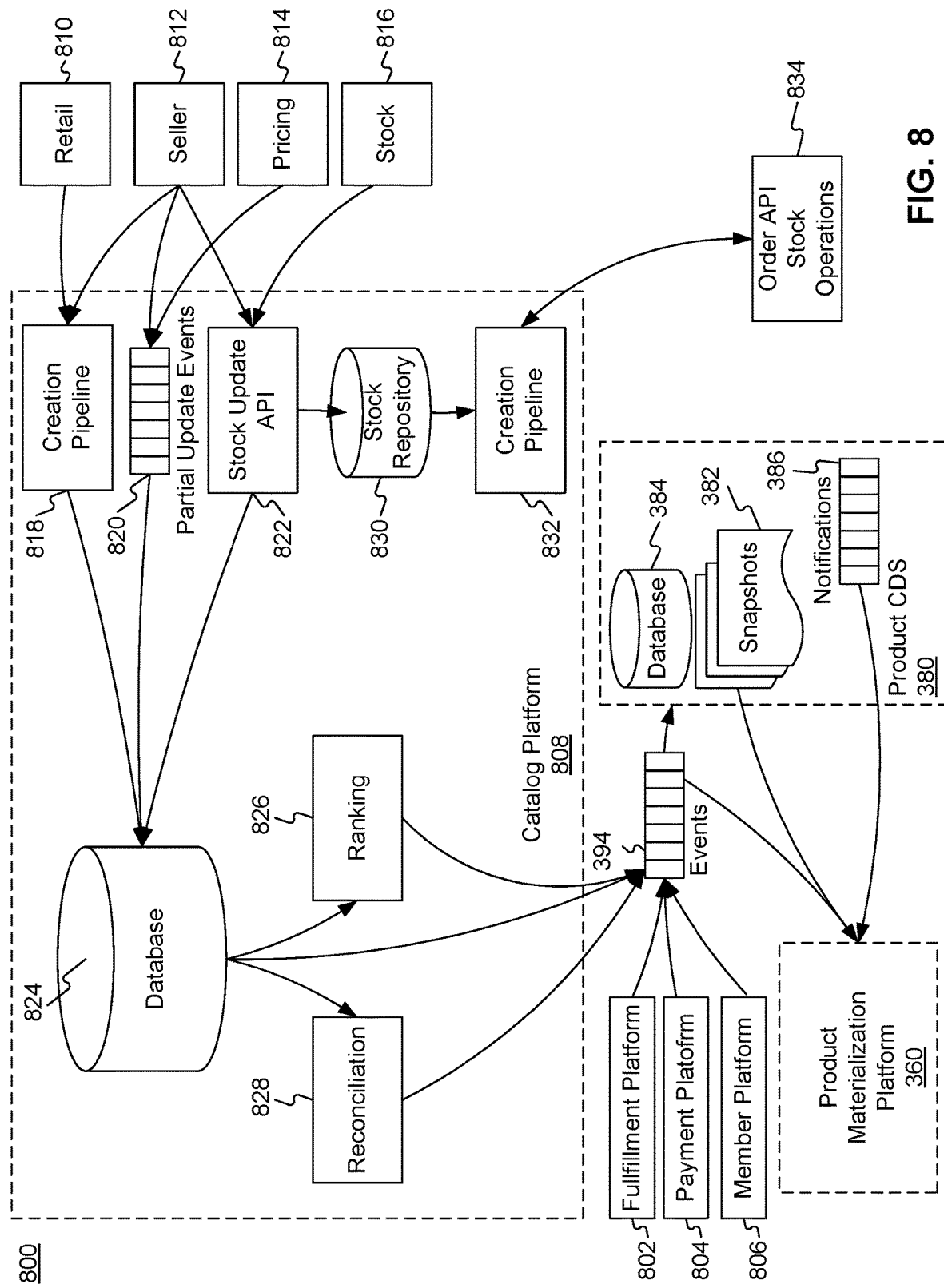
FIG. 8 depicts a system for low-latency data aggregation services, consistent with disclosed embodiments.

FIG. 8 depicts a system 800 for low-latency data aggregation services, consistent with disclosed embodiments. FIG. 8 presents nonlimiting examples of sources of events 394. System 800 may be included in system 300 and/or may include components of system 300. For example, system 800 may include a product materialization platform 360, product CDS 380, database 384, snapshots 382, notifications 386, events 394, and/or one or more other components of system 300. Additionally, system 800 may include fulfillment platform 802, a payment platform 804, a member platform 806, a catalog platform 808, retail 810, seller 812, pricing 814, stock 816, order API stock operations 834, and/or other components. As shown, catalog platform 808 may include a creation pipeline, partial update events 820, stock repository 830, stock API 832, database 824, reconciliation 828, ranking 826, and/or other components. It is to be understood that system 800 may include different components and/or more or fewer components than those depicted in system 800.

Fulfillment platform 802, payment platform 804, member platform 806, and/or catalog platform 808 may be external (third-party) systems capable of transmitting order fulfillment data, payment data, member (user) data, and/or catalog data, respectively, to system 800 as events 394.

In some embodiments, retail 810, seller 812, pricing 814, and/or stock 816, may be external systems capable of transmitting retail data, seller data, pricing data, and/or stock data to catalog platform 808. In some embodiments, retail 810, seller 812, pricing 814, and/or stock 816 may include one or more data repositories. In some embodiments, retail 810, seller 812, pricing 814 and/or stock 816 may be part of a same system or data repository. It should be understood that retail 810, seller 812, pricing 814, and/or stock 816 may refer to one or more third party systems (e.g., retail 810 may refer to a plurality of third-party systems capable of transmitting retail data).

In some embodiments, creation pipeline 818 receives data from retail 810 and seller 812, consistent with disclosed embodiments. Received data may include information relating to products. In some embodiments, creation pipeline 818 updates database 824 based on received data.

Seller 812 and/or pricing 814 may transmit data to as partial update events 820 to catalog platform 808. Partial update events 820 may include event data, consistent with disclosed embodiments. Partial update events 820 may include data that partially updates product data (e.g., data that may change some but not all information associated with a product).

In some embodiments, stock update API receives data from seller 812 and/or stock 816. Stock update API may be configured to updated database 824 and/or stock repository 830 with stock data and/or seller data reflecting real time quantities at warehouse locations, seller locations, and/or other locations. Stock repository 830 may include a database for storing stock data, consistent with disclosed embodiments.

Stock API 832 may be configured to provide receive information from order API stock operations (e.g., information on managing stock data) and/or to provide stock updates to order API stock operations 834. Order API stock operations 834 may be an API capable of providing data to third party sellers for managing stock information in real time.

Database 824 may include real time retail, seller, pricing, and stock data for providing a listing (catalog) of products in real time. Database 824 may include data associated with a plurality of sellers and/or products. Database 824 may include any known database, including a database designed for scalability and/or fault tolerance (e.g., a CASSANDRA database). Database 824 may include a plurality of clusters configured for failover protection, consistent with disclosed embodiments.

As shown in FIG. 8, reconciliation 828 and ranking 826 may receive data from database 824. In some embodiments, reconciliation 828, ranking 826, and/or database 824 may generate events 394, consistent with disclosed embodiments. Reconciliation 828 may be configured to reconcile information based on database 824. For example, database 824 may include data for product offered by a plurality of different sellers. Reconciliation 828 may be configured to determine image quality, title quality or accuracy, product description quality or accuracy, or other information relating to the quality of information associated with a product. Reconciliation 828 may be configured to rank and/or chose listings of a product based on the quality of information associated with a listing (e.g., reconciliation 828 may be configured to identify and/or choose a best listing).

Ranking 826 may be configured to rank sellers based on data in database 824. For example, ranking 826 may be configured to rank sellers based on historical product data (e.g., stock data, user feedback, delivery time data, and/or other data). Ranking 826 may be configured to use statistical and/or machine learning methods to rank sellers.

Accordingly, as shown in FIG. 8, system 800 illustrates examples of generating event data comprising retail data, stock data, pricing data, reconciled data, and/or seller ranking data to provide to product CDS 380 and/or product materialization platform 360.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for low latency aggregated data provision, the system comprising:
    at least one memory storing instructions; and
    at least one processor configured to execute the instructions to perform operations comprising:
        receiving, via a materialization service, data from multiple sources related to an item associated with a webpage hosted by a web server, the data including:
        first event data from a first data store, the first event data sourced from a real-time feed, wherein the first event data is generated by a first set of devices, and
        second event data from a second data store, the second event data sourced from stored data, wherein the second event data is generated by a second set of devices;
        generating synchronized data at the materialization service, based on the first event data and/or second event data;
        receiving a request from the web server for information related to the item after generating synchronized data, the request being associated with a user segment;
        identifying, based on the request, data related to the first event data and the second event data to aggregate to fulfill the received request;
        generating, based on the identified event related data and the user segment, a data structure structured to initialize an aggregation process, the data structure comprising a directed acyclic graph and wherein generating the data structure comprises generating an earlier node of the directed acyclic graph based on a later node of the directed acyclic graph, wherein nodes of the directed acyclic graph include the identified event related data;
        aggregating the synchronized data by following a path through nodes of the directed acyclic graph of the data structure, wherein the path through the nodes of the directed acyclic graph is dynamically identified based on latency data in the data structure to optimize aggregation of the synchronized data; and
        forwarding the aggregated synchronized data to the web server in response to the request.

2. The computer-implemented system of claim 1, wherein the webpage comprises interactive user interface elements and at least one of:
    information about the item; or
    one or more search results satisfying a search request.

3. The computer-implemented system of claim 1, wherein the first data store is a key-value data store.

4. The computer-implemented system of claim 1, wherein the synchronized data comprises at least one of first event data, second event data, or a combination of first and second event data.

5. The computer-implemented system of claim 1, wherein the operations further comprise updating the second data store with updated data based on a push event, and wherein the second event data is based on updated data.

6. The computer-implemented system of claim 1, wherein the materialization service comprises a first cluster and a second cluster, the first cluster and second cluster being configured to independently and jointly receive the data from multiple sources related to the item and to synchronize the first event data and second event data.

7. The computer-implemented system of claim 1, wherein the second event data is sourced from stored data stored in a clustered database comprising a first cluster and a second cluster.

8. The computer-implemented system of claim 7, wherein upon failure by one of the first cluster or second cluster, the second event data is received from the other of the first cluster or second cluster.

9. The computer-implemented system of claim 1, wherein the user segment is based on at least one of a location, a user history, or a promotion condition.

10. A computer-implemented method for low-latency aggregated-data provision, the method comprising:
    receiving, via a materialization service, data from multiple sources related to an item associated with a webpage hosted by a web server, the data including:
    first event data from a first data store, the first event data sourced from a real-time feed, wherein the first event data is generated by a first set of devices, and
    second event data from a second data store, the second event data sourced from stored data, wherein the second event data is generated by a second set of devices;
    generating synchronized data at the materialization service, based on the first event data and/or second event data;
    receiving a request from the web server for information related to the item after generating synchronized data, the request being associated with a user segment;
    identifying, based on the request, data related to the first event data and the second event data to aggregate to fulfill the received request;
    generating, based on the identified event related data and the user segment, a data structure structured to initialize an aggregation process, the data structure comprising a directed acyclic graph and wherein generating the data structure comprises generating an earlier node of the directed acyclic graph based on a later node of the directed acyclic graph, wherein nodes of the directed acyclic graph include the identified event related data;
    aggregating the synchronized data by following a path through nodes of the directed acyclic graph of the data structure, wherein the path through the nodes of the directed acyclic graph is dynamically identified based on latency data in the data structure to optimize aggregation of the synchronized data; and
    forwarding the aggregated synchronized data to the web server in response to the request.

11. The computer-implemented method of claim 10, wherein the webpage comprises interactive user interface elements and at least one of:
    information about the item; or
    one or more search results satisfying a search request.

12. The computer-implemented method of claim 10, wherein the first data store is a key-value data store.

13. The computer-implemented method of claim 10, wherein the method further comprises updating the second data store with updated data based on a push event, and wherein the second event data is based on updated data.

14. The computer-implemented method of claim 10, wherein the materialization service comprises a first cluster and a second cluster, the first cluster and second cluster being configured to independently and jointly receive the data from multiple sources related to the item and to synchronize the first event data and second event data.

15. The computer-implemented method of claim 10, wherein the second event data is sourced from stored data stored in a clustered database comprising a first cluster and a second cluster.

16. The computer-implemented method of claim 15, wherein upon failure by one of the first cluster or second cluster, the second event data is received from the other of the first cluster or second cluster.

17. The computer-implemented method of claim 10, wherein the user segment is based on at least one of a location, a user history, or a promotion condition.

18. A computer-implemented system for low-latency aggregated-data provision, the system comprising:
    at least one memory storing instructions; and
    at least one processor configured to execute the instructions to perform operations comprising:
    receiving, via a materialization service, data from multiple sources related to an item associated with a webpage hosted by a web server, the data including:
    first event data from a first data store comprising a key-value store, the first event data sourced from a real-time feed, wherein the first event data is generated by a first set of devices, and
    second event data from a second data store comprising a clustered database, the second event data sourced from stored data comprising primitive data, wherein the second event data is generated by a second set of devices;
    generating synchronized data at the materialization service, based on the first event data, the second event data, and a timestamp of the first event data or the second event data;
    receiving a request from the web server for information related to the item after generating synchronized data;
    determining a user segment with the request based on at least one of a location, a user history, or a promotion condition;
    identifying data related to the first event data and the second event data to aggregate to fulfill the received request;
    generating, based on the identified event related data and the user segment, a data structure structured to initialize an aggregation process, wherein the data structure comprises a directed acyclic graph and wherein generating the data structure comprises generating an earlier node of the directed acyclic graph based on a later node of the directed acyclic graph, wherein nodes of the directed acyclic graph include the identified event related data;
    aggregating the synchronized data by following a path through nodes of the directed acyclic graph of the data structure, wherein the path through the nodes of the directed acyclic graph is dynamically identified based on latency data in the data structure to optimize aggregation of the synchronized data; and
    forwarding the aggregated synchronized data to the web server in response to the request.

* * * * *